United States Patent
Mentink

[11] Patent Number: 6,152,709
[45] Date of Patent: Nov. 28, 2000

[54] HYDRAULIC DRIVE CYLINDER

[75] Inventor: Laurentius A. G. Mentink, Haaksbergen, Netherlands

[73] Assignee: Applied Power Inc., Butler, Wis.

[21] Appl. No.: 09/271,006

[22] Filed: Mar. 17, 1999

[30] Foreign Application Priority Data

Mar. 20, 1998 [NL] Netherlands ............................ 1008656

[51] Int. Cl.$^7$ .............................. F04B 39/10; F01B 7/20
[52] U.S. Cl. .................................. 417/534; 92/51; 91/169
[58] Field of Search .................................. 92/51; 91/169; 417/534

[56] References Cited

U.S. PATENT DOCUMENTS

| | | | |
|---|---|---|---|
| 762,627 | 6/1904 | Fink | 91/169 |
| 2,893,353 | 7/1959 | Short, Jr. | 92/51 |
| 3,008,454 | 11/1961 | Wilkins | 91/169 |
| 3,269,275 | 8/1966 | Waite | 92/52 |
| 3,614,912 | 10/1971 | Nepp | 92/51 |
| 4,199,007 | 4/1980 | Holmes | 91/467 |
| 5,014,602 | 5/1991 | Iwata | 92/51 |

FOREIGN PATENT DOCUMENTS 0 309 066 A1   3/1989   European Pat. Off. .

*Primary Examiner*—Charles G. Freay
*Assistant Examiner*—Michael K. Gray
*Attorney, Agent, or Firm*—Quarles & Brady LLP

[57] ABSTRACT

A hydraulic drive cylinder with a cylinder tube, which at its respective ends has a cylinder base and a cylinder head, thus delimiting a cylinder space. A piston can move to and fro in the cylinder space between the cylinder base and the cylinder head, which piston delimits a head-side chamber and a base-side chamber, which chambers are sealed off from one another by the piston. The piston rod has a free end which is delimited by an end face, which end face is situated in the head-side chamber. At the said free end, the piston rod is provided with a first stop. The piston is provided with a projection which extends towards the cylinder head inside the head-side chamber and is provided, at a distance from the piston, with a second stop, in such a manner that the piston rod can move to and fro along an axial travel with respect to the piston, between a retracted position with respect to the piston and an extended position with respect to the piston, in which the first and second stops bear against one another, and in such a manner that when hydraulic pressure is present in the head-side chamber the piston rod adopts the extended position with respect to the piston.

4 Claims, 5 Drawing Sheets

HYDRAULIC DRIVE CYLINDER

FIELD OF THE INVENTION

The present invention relates to a hydraulic drive cylinder with two connections for feeding and discharging hydraulic fluid, it being possible for the piston rod of the drive cylinder to be held hydraulically not only in the two end positions but also in an intermediate position. The invention relates in particular to a folding-roof assembly which is provided with a hydraulic drive cylinder of this nature.

DESCRIPTION OF THE PRIOR ART

Double-acting hydraulic drive cylinders in which the piston rod is fixedly connected to the piston are generally known from the prior art. The piston rod of a drive cylinder of this nature has two end positions, namely the fully retracted position, in which the piston bears against the cylinder base, and the fully extended position, in which the piston bears against the cylinder head. If it is desired, in a cylinder of this nature, to hold the piston rod stationary in a predetermined intermediate position, a sensor is required in order to detect the position of the piston rod, and furthermore retention means are required in order to fix the piston rod in the intended intermediate position. Known retention means comprise, for example, a clamping device for the piston rod. Another known solution for fixing the piston rod in the intermediate position consists in providing a set of hydraulically actuable valves, e.g. pilot operated check valves, in the two hydraulic lines leading to the chambers of the cylinder, making it possible to prevent hydraulic fluid from flowing out of the chambers so that the piston rod is held hydraulically in place.

Furthermore, the prior art discloses so-called hydraulic tandem cylinders, in which two piston/piston-rod assemblies which lie in line with one another are present in the cylinder tube, each assembly comprising a piston and a piston rod which is fixedly connected thereto. The piston rod of one assembly in this case projects outwards. The two pistons form three variable chambers in the cylinder space, a separate connection for feeding and discharging hydraulic fluid being provided for each chamber. In a cylinder of this nature, it is possible, by suitably pressurizing the three chambers, to provide an intermediate position for the piston rod which projects outwards, in which intermediate position the piston rod is held hydraulically in place by the pressure in the said chambers. This design has the advantage over the example mentioned above that there is no need for a sensor and associated circuit for detecting the intermediate position of the piston rod. However, a drawback compared to a double-acting cylinder is that a tandem cylinder requires more, or more complex, hydraulic valves in order to control the feed and discharge of hydraulic fluid to and from the three chambers of the tandem cylinder.

OBJECT OF THE INVENTION

The object of the present invention is to provide a hydraulic drive cylinder with two connections, in which cylinder the piston rod can be held hydraulically not only in the end positions but also in an intermediate position which lies between the end positions.

SUMMARY OF THE INVENTION

The present invention provides a hydraulic drive cylinder according to claim 1. Further advantageous embodiments of the drive cylinder, as well as a particularly advantageous use thereof for actuating the rear part of a folding roof of a convertible vehicle are described in the claims and the following description, with reference to the drawing.

DETAILED DESCRIPTION OF THE DRAWINGS

Figure 1:
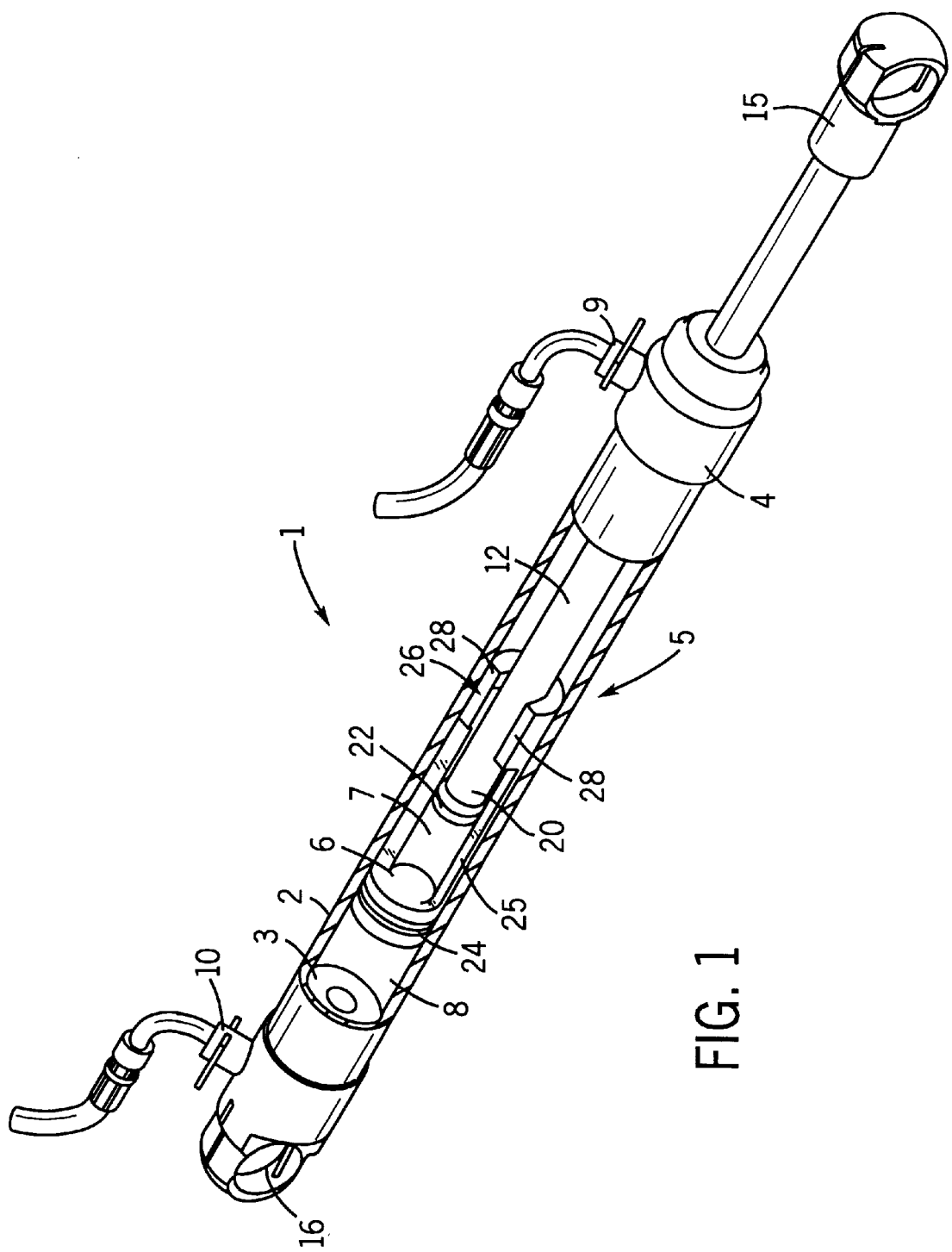
FIG. 1 shows a perspective, partially cut-away view of a preferred embodiment of the hydraulic drive cylinder according to the invention.

The hydraulic drive cylinder 1 shown in FIGS. 1–4 comprises a cylinder tube 2, which at its respective ends has a cylinder base 3 and a cylinder head 4, thus delimiting a cylinder space 5. It will be clear that the cylinder tube 2 may also have a different form from the metal cylindrical tube shown here. Furthermore, the cylinder base 3 could, for example, form a single unit with the cylinder tube 2.

In the cylinder space 5 there is a piston 6 which can move to and fro between the cylinder base 3 and the cylinder head 4 and is provided with sealing means, in this case a sealing ring 24, which act in a sealing manner on the cylinder tube 2. On the side of the cylinder head 4, the piston 6 delimits a head-side chamber 7, and on the side of the cylinder base 3, it delimits a base-side chamber 8. These chambers 7, 8 are sealed off from one another by the piston 6.

A fluid connection 9, 10 for feeding and discharging hydraulic fluid is provided for each of the said chambers 7, 8.

Furthermore, the drive cylinder 1 comprises a piston rod 12 which is coupled to the piston 6 and projects outwards through a bore in the cylinder head 4, a seal, in this case sealing rings 13, which acts on the piston rod, being arranged in the said bore.

In order to attach the cylinder 1, the piston rod 12 is provided at its end which projects outwards with a ball-and-socket joint 15, and the cylinder base 3 is provided with a bore 16 for receiving a second ball-and-socket joint.

The piston rod 6 has a free end 20 which is delimited by an end face 21, which end face 21 is situated in the head-side chamber 7. At that free end 20, the piston rod 12 is provided with a first stop 22, which forms an annular stop face 23 which has a greater external diameter than the piston rod 12.

Furthermore, the piston 6 is provided with a projection or extension 25 which extends towards the cylinder head 4 inside the head-side chamber 7 and is provided, at a distance from the piston 6, with a second stop 26, in such a manner that the piston rod 12 can move to and fro along an axial travel with respect to the piston 6, between a retracted position with respect to the piston 6 and an extended position with respect to the piston 6.

In the extended position with respect to the piston 6, the first stop 22 of the piston rod 12 bears against the second stop 26 which is attached to the piston 6 via the projection 25.

It can clearly be seen from FIG. 1 that the projection 25 is in this case designed as a semicylindrical wall with two limbs 28 at its end which is remote from the piston 6, which limbs form the second stop and between them form a slot through which the piston rod 12 projects.

The design shown ensures that when there is hydraulic pressure in the head-side chamber 7 the piston rod 12 adopts the extended position with respect to the piston 6.

It will be clear that as an alternative to one projection 25 there may also be a plurality of projections, for example distributed around the circumference of the chamber 7, each with an associated second stop.

The functioning of the drive cylinder 1 which has been described with reference to FIG. 1 will now be explained with reference to FIGS. 2, 3 and 4.

Figure 2:
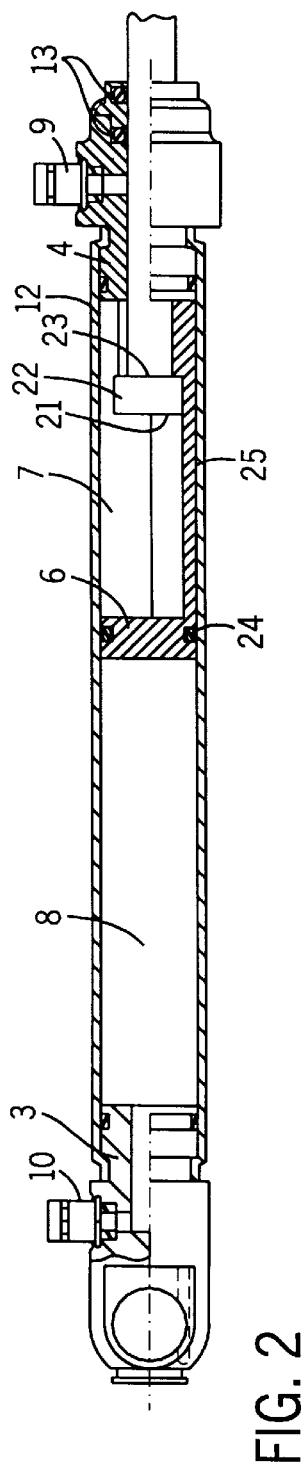
FIG. 2 shows the drive cylinder of FIG. 1 in the extended position.

In FIG. 2, the same hydraulic pressure is being applied at the connection 10 and the connection 9 of the drive cylinder 1. Due to the difference in active surface area between the piston 6 on the side of the base-side chamber 8, on the one hand, and on the side of the head-side chamber 7, on the other hand, the piston 6 is forced towards its extended limit position. Since hydraulic pressure prevails in the chamber 7, the piston rod 12 is held in its extended position with respect to the piston 6, so that the piston rod 12 is now in its fully extended position.

Figure 3:
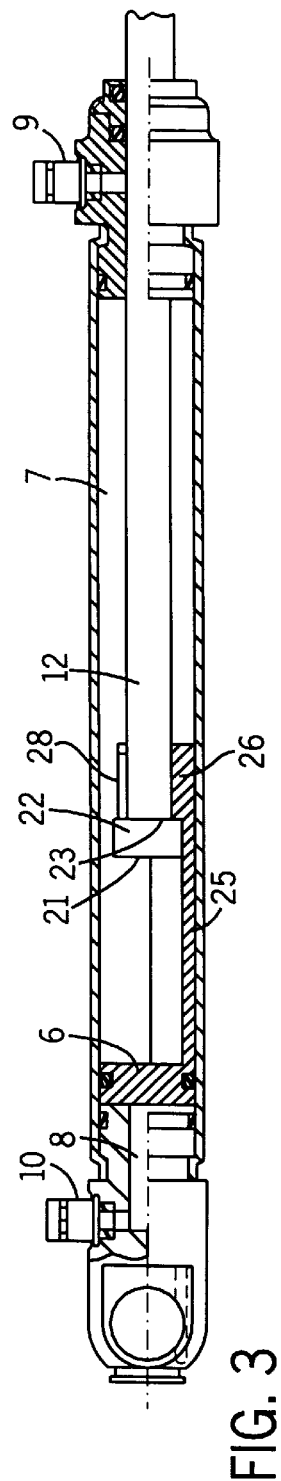
FIG. 3 shows the drive cylinder of FIG. 1 in an intermediate position.

Allowing hydraulic fluid to flow out of the base-side working chamber 8 via the connection 10 while feeding hydraulic fluid in via connection 9 results in the intermediate position of the piston rod 12 shown in FIG. 3 being reached. In this position, the piston 6 is forced against the cylinder base 4 by the hydraulic pressure in the chamber 7. The hydraulic pressure in the chamber 7 ensures that the piston rod 12 is still being forced into its extended position with respect to the piston 6, with its stop 22 bearing against the stop 26 of the piston 6.

Figure 4:
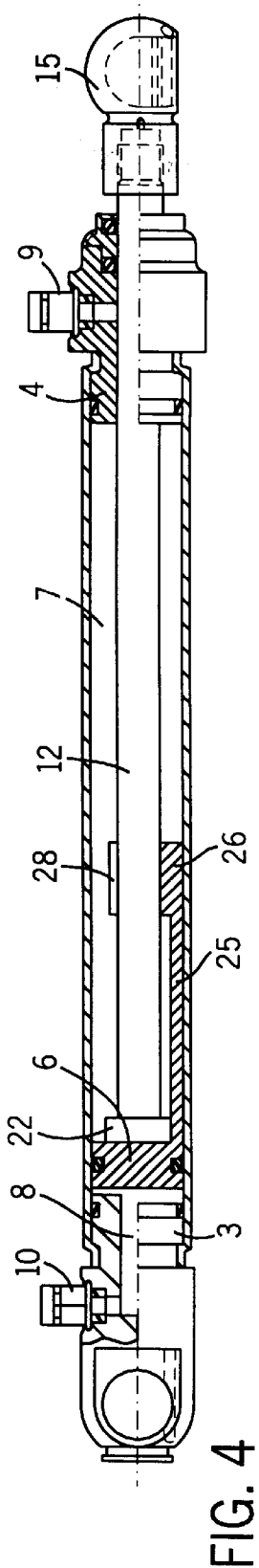
FIG. 4 shows the drive cylinder of FIG. 1 in the retracted position.

If the connection 9 to the head-side chamber 7 is connected in such a manner that hydraulic fluid can flow out of the drive cylinder via the connection 9, it is possible, by exerting an external push-in force on the piston rod 12, to reach the fully retracted position shown in FIG. 4.

If hydraulic pressure is generated only in the base-side chamber 8 and not in the chamber 7, the piston rod 12 can move freely to and fro, within the travel length determined by the stops 22 and 26, with respect to the fully extended piston 6.

In summary, if the same hydraulic pressure is applied to the head side chamber 7 and the base side chamber 8, the piston rod 12 moves into the fully extended position of FIG. 2. Relieving pressure from the base side chamber 8 while continuing to apply pressure to chamber 7 moves the rod 12 into the intermediate position of FIG. 3. Relieving pressure from both chambers 7 and 8 and providing a push-in force to the rod 12 moves the rod 12 into the fully retracted position of FIG. 4. If pressure is relieved from the chamber 7 and only applied to the chamber 8, the piston 6 is moved into the position shown in FIG. 2, and the piston rod 12 can move freely within the limits provided by the projection 25.

The drive cylinder 1 according to the invention which has been explained with reference to FIGS. 1–4 can be used to good effect in a hydraulic actuating device for a folding roof of a convertible vehicle. An example of this application will be explained in more detail below with reference to FIGS. 5, 6 and 7.

Figure 5:
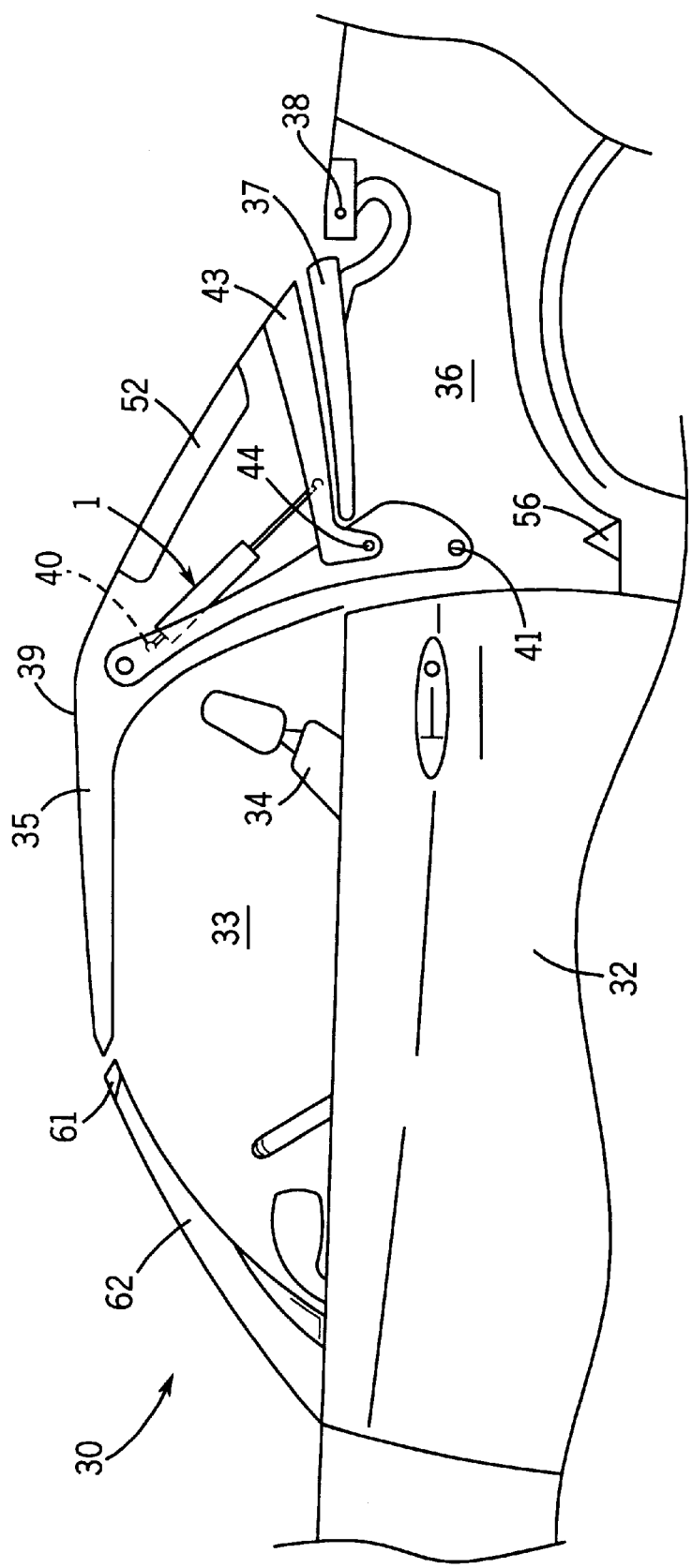
FIG. 5 shows a diagrammatic side view of part of a vehicle of the convertible type with a folding-roof assembly in which the drive cylinder of FIG. 1 is used, with part of the body not shown and the folding roof in the closed position.
Figure 6:
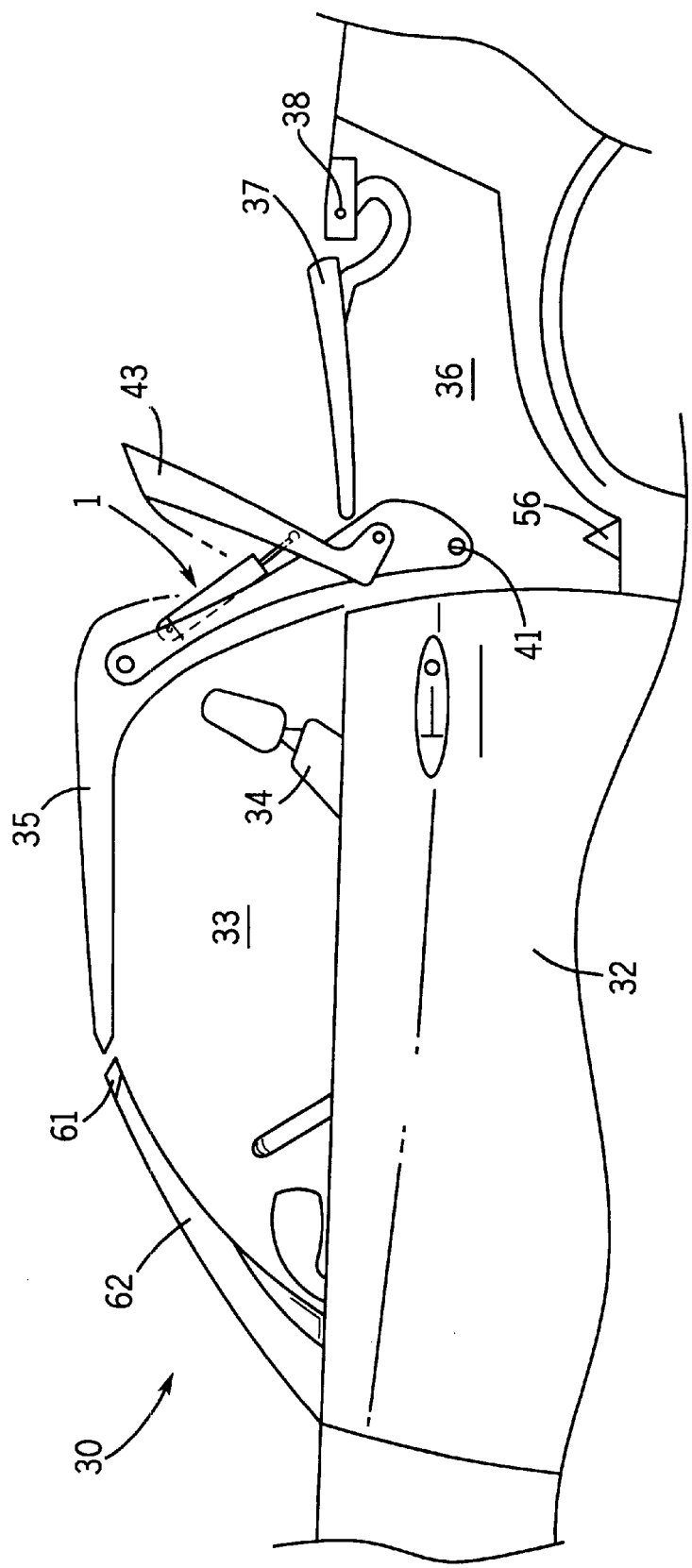
FIG. 6 shows a view corresponding to FIG. 5, in which the drive cylinder is in the intermediate position, so that the rear part of the folding roof is pivoted upwards.
Figure 7:
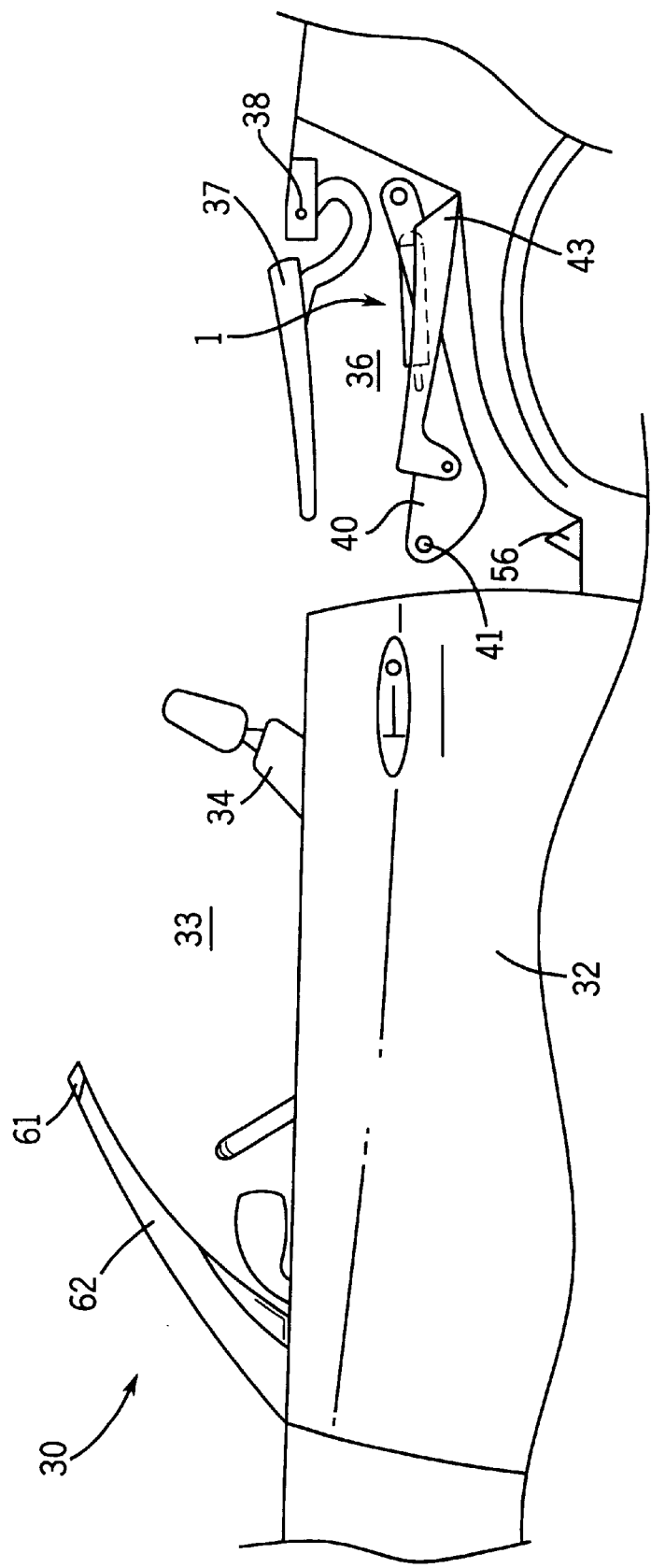
FIG. 7 shows a view in accordance with FIG. 5, with the folding roof in the open position.

FIGS. 5, 6 and 7 diagrammatically show part of a passenger vehicle 30 of the convertible type, having a body 32 and a passenger compartment 33 within. For the sake of clarity, the side of the body in the section which lies behind the seats 34 of the vehicle is not shown here.

The vehicle 30 comprises a folding roof 35 which, in the closed position, covers the passenger compartment 32 and, in the open position, is accommodated in a compartment 36 which lies behind the passenger compartment 32. To close off the compartment 36, a pivoting lid 37 is arranged at the rear edge of the compartment 36. The pivoting lid 37 can be pivoted, by means of drive means (not shown in more detail), for example a double-acting hydraulic cylinder, about an associated pivot pin 38 between a substantially horizontal position, in which the pivoting lid 37 closes off the compartment 36 and a vertical position in which the compartment 36 is open. Furthermore, a lid lock (not shown) is provided in order to lock the pivoting lid 37 in the position in which it closes off the compartment 36.

The folding roof 35 comprises a foldable cover 39 made from a suitable fabric and a framework for the cover 39. Only those parts of the framework which are relevant for explaining the present invention are shown. These components comprise a substantially U-shaped main bracket 40, which at its two ends is arranged on the body 32 in such a manner that it can pivot about a substantially horizontal pivot pin 41, and furthermore a substantially U-shaped rear bracket 43, which extends along the rear edge of the cover 39 and is connected to the cover 39. At both its ends, the rear bracket 43 is arranged on the main bracket 40 in such a manner that it can pivot about a substantially horizontal pivot pin 44.

A window 52 is arranged in that part of the cover 39 which lies between the rear bracket 43 and the main bracket 40. The window 52 is in this case rigid and cannot fold, being made, for example, of glass or a hard, transparent plastic.

A hydraulic actuating device is provided for the purpose of moving the folding roof 35. In this example, this actuating device comprises a hydraulic unit (not shown) with an electrically driven pump, a hydraulic-fluid reservoir and hydraulic cylinders which are connected to the pump and the reservoir via associated lines. A pair of, or a single, double-acting hydraulic cylinder(s) (not shown) is/are used to pivot the main bracket 40. These cylinders may, for example, each be disposed between a support 56, which is attached to the body 32, and the main bracket 40.

In order to pivot the rear bracket 43, at least one cylinder 1 is provided, which in this example is disposed between the main bracket 40 and the rear bracket 43. If appropriate, two cylinders 1 are connected in parallel, a cylinder 1 acting on each side arm of the rear bracket 43.

FIG. 5 shows the closed position of the folding roof 35. In this closed position, the cylinder 1 is fully extended, cf. FIG. 2, and the rear bracket 43 lies on top of the pivoting lid 37, which is in its horizontal, closed position.

To open the folding roof 35, firstly the side windows are lowered, and the front edge of the folding roof 35 is unlocked from the bar 61 above the windscreen 62. Then, with the aid of the cylinder 1, the rear bracket 43 is pivoted upwards into the position shown in FIG. 6 by allowing hydraulic fluid to flow out via connection 10 and feeding hydraulic fluid in via connection 9.

In FIG. 6, the cylinder 1 is in the intermediate position shown in FIG. 3. In this position, the rear bracket 43 is not pivoted upwards to its maximum extent, but to a sufficient extent to open the pivoting lid 37. This is because opening the rear bracket 43 to its maximum extent in this position would, on the one hand, take longer and, on the other hand, damage the non-foldable window 52. In the intermediate position shown, the piston rod 12 is hydraulically fixed in place and, therefore, cannot be moved by applying an external force. Inter alia, this prevents the possibility of the rear bracket 43 in this intermediate position being moved manually, which may disrupt the sequence of movements.

After the pivoting lid 37, which is pivoting upwards, has moved past, the cylinder 1 is extended again, possibly not completely, by feeding hydraulic fluid to both connections 9 and 10. When the cylinder 1 is extended, the two fluid connections 9 and 10 of the cylinder 1 are then connected to the reservoir of the pump unit, so that the piston rod 12 can move to and fro between its end positions virtually without any obstacles. Then, by suitably actuating the cylinders associated with the main bracket 40, the folding roof 35 is pivoted into the compartment 36. During this movement, the rear bracket 43 is moved onto the base of the compartment 36, with the result that the piston rod 12 is retracted, virtually as far as the fully retracted position shown in FIG. 4. Then, the pivoting lid 37 can be closed, resulting in the position shown in FIG. 7.

The folding roof 35 is closed substantially in the reverse order, and this operation will not be described further here.

It will be clear that the drive cylinder 1 is also suitable for other applications, for example for pivoting the main bracket of the folding roof if an intermediate position is desirable in this operation.

What is claimed is:

1. A hydraulic drive cylinder comprising a cylinder tube, which at its respective ends has a cylinder base and a cylinder head, thus delimiting a cylinder space, a piston which is reciprocable in the cylinder space between the cylinder base and the cylinder head, said piston being provided with sealing means which act in a sealing manner on the cylinder tube and delimits, on the side of the cylinder head, a head-side chamber and, on the side of the cylinder base, a base-side chamber, which chambers are sealed off from one another by the piston, first and second fluid connections for feeding and discharging hydraulic fluid to and from said chambers, a piston rod which is coupled to the piston and projects outward through the cylinder head, wherein the piston rod has a free end which is delimited by an end face, which end face is situated in the head-side chamber, wherein the piston rod is provided, at said free end, with a first stop, wherein the piston is provided with a projection which extends toward the cylinder head inside the head-side chamber and is provided, at a distance from the piston, with a second stop, such that the piston rod can move to and fro axially with respect to the piston between a retracted position with respect to the piston and an extended position with respect to the piston in which the first and second stops bear against one another, and such that when hydraulic pressure is present in the head-side chamber the piston rod adopts the extended position with respect to the piston.

2. A drive cylinder according to claim 1, in which the projection extends along the cylinder tube from the piston, and, at a distance from the piston, forms the second stop.

3. A drive cylinder according to claim 1, in which the projection extends along the cylinder tube from the piston, and, at a distance from the piston, has two limbs with an opening between them, through which the piston rod projects, which limbs form the second stop.

4. A drive cylinder according to claim 1, in which the first stop forms an annular stop face which has a greater external diameter than the piston rod.

\* \* \* \* \*